(No Model.)
W. S. CRAIG.
ANCHOR BOLT.
No. 332,701. Patented Dec. 22, 1885.
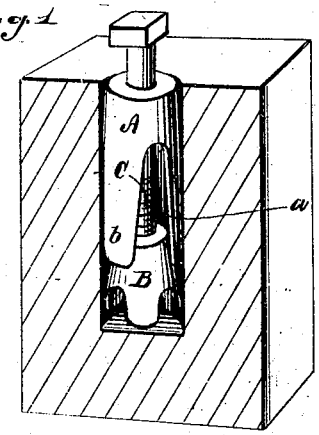
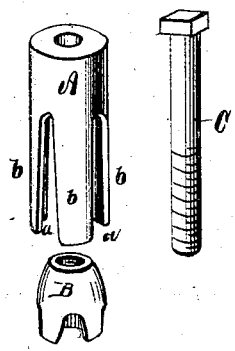
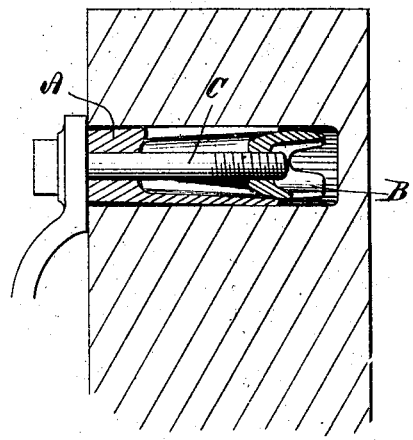
Attest
E. E. Grim
W. S. Cushman
Inventor
William S. Craig
By Paul A. Staley
Atty

UNITED STATES PATENT OFFICE.

WILLIAM S. CRAIG, OF SPRINGFIELD, OHIO.

ANCHOR-BOLT.

SPECIFICATION forming part of Letters Patent No. 332,701, dated December 22, 1885.

Application filed April 14, 1885. Serial No. 162,260. (No model.)

*To all whom it may concern:*

Be it known that I, WILLIAM S. CRAIG, a citizen of the United States, residing at Springfield, in the county of Clark and State of Ohio, have invented certain new and useful Improvements in Anchor-Bolts or Expanding-Nuts, of which the following is a specification.

The object of this invention is to provide a device adapted to be used for anchoring purposes in stone posts or walls of brick or stone, said device being adapted to be automatically tightened in its seat by the operation which secures the article to be held thereby.

The invention consists in an expanding-sleeve and a tapered or wedge-shaped piece adapted to be forced into said sleeve by a bolt or rod, which passes through said sleeve and secures the article to be held by the device.

In the accompanying drawings, Figure 1 is a perspective view, shown partly in section, of the device in place in the top of a stone post. Fig. 2 is a longitudinal sectional view of the device in a vertical wall. Fig. 3 is a perspective view showing the various parts removed and in detail.

Like parts are indicated by similar letters of reference throughout the several views.

In the said drawings, A represents the sleeve, and B the tapered piece, adapted to be drawn therein. The sleeve A is preferably provided with longitudinal openings *a a a*, extending from the bottom thereof, thus forming legs or strips *b b*, which are adapted to be expanded as the piece B is drawn into the sleeve. The tapered piece B is preferably tapped out and adapted to receive the threaded end of a rod or bolt, C. The upper end of the sleeve A is preferably provided with an opening adapted to receive the bolt C, which passes through said opening, and to form a bearing therefor. It will be seen that when the bolt is screwed into the tapered piece B said piece will be drawn into the sleeve and the said sleeve thus expanded until it binds tightly in the hole or opening into which it is placed.

The device is particularly useful in securing the bottoms of iron fences, which, as is well known, are usually secured to stone posts. It is also adapted for use in various other connections in which anchor-bolts are used, and obviates the necessity of bushing with lead or brimstone.

The device may be of any convenient size, and may be modified, as desired, to suit different uses to which it may be applied.

Instead of the bolt, a rod may be secured to the tapered piece and adapted to be drawn through the sleeve by means of a key at the top; or other suitable means may be employed for forcing the tapered piece into the sleeve, and thus expanding said sleeve.

When the bolt is used and adapted to screw into the tapered piece B, I make the piece hollow at the bottom and of considerable length, so that considerable space is left between the end of the bolt and the bottom of the hole into which the sleeve is placed. I also preferably notch the sides of the bottom of the said tapered piece, as shown, thus economizing the material and at the same time by this construction rendering the tapered piece less liable to turn when the bolt is screwed therein.

It is obvious that the device may be modified in various ways without departing from the spirit of my invention, and it will be seen that it can be utilized in various ways and for various purposes to which it may be applied.

Having thus described my invention, I claim—

1. The combination, with the cylindrical tapered piece, of the cylindrical sleeve having three or more longitudinal openings and a similar number of legs adapted to be expanded by said tapered piece, and means for forcing said tapered piece into said sleeve, substantially as specified.

2. The combination, with the sleeve having the longitudinal openings therein, of the tapered piece hollowed out and notched at the bottom thereof, and a bolt adapted to extend through said sleeve and screw into said tapered piece, which is correspondingly tapped, substantially as specified.

In testimony whereof I have hereunto set my hand this 6th day of April, A. D. 1885.

WILLIAM S. CRAIG.

Witnesses:
C. F. PEUGH,
PAUL A. STALEY.